United States Patent [19]

Epple et al.

[11] 4,150,419

[45] Apr. 17, 1979

[54] ELECTRICAL CAPACITOR WITH A FUSE

[75] Inventors: Richard Epple, Schwaigern; Werner Seiff, Berlin, both of Fed. Rep. of Germany

[73] Assignee: Licentia Patent-Verwaltungs-G.m.b.H., Fed. Rep. of Germany

[21] Appl. No.: 824,698

[22] Filed: Aug. 15, 1977

[30] Foreign Application Priority Data

Aug. 13, 1976 [DE] Fed. Rep. of Germany ....... 2636544
Aug. 27, 1976 [DE] Fed. Rep. of Germany ....... 2638611
Nov. 4, 1976 [DE] Fed. Rep. of Germany ....... 2650468

[51] Int. Cl.² ............................................. H01G 1/11
[52] U.S. Cl. .................................... 361/275; 361/273; 361/274
[58] Field of Search ................ 361/275, 272, 274, 273, 361/15, 16, 17

[56] References Cited

U.S. PATENT DOCUMENTS 3,155,876  11/1964  Paul ........................................ 361/15

FOREIGN PATENT DOCUMENTS 1441507  7/1976  United Kingdom ..................... 361/275

Primary Examiner—E. A. Goldberg
Attorney, Agent, or Firm—McGlew and Tuttle

[57] ABSTRACT

The outer envelope of a capacitor body is provided with an insulation layer and at least the sides are surrounded in consecutive order by a first metal actuation layer, an insulation layer which is deformable or defusable under excess temperature, and a second metal actuation layer with the first metal actuation layer being connected to the first metal conductive layer and the second metal actuation layer being connected to the other metal conductive layer. The construction is such that if there is an increase in temperature in the capacitor body which, for example, may be caused by an overload or a defect, the insulation between the actuation layers will defuse or deform to the extent that the metal layers come in contact and produce a short-circuit which will be effective to throw the capacitor out of the line, such as, by a fusing action.

22 Claims, 7 Drawing Figures

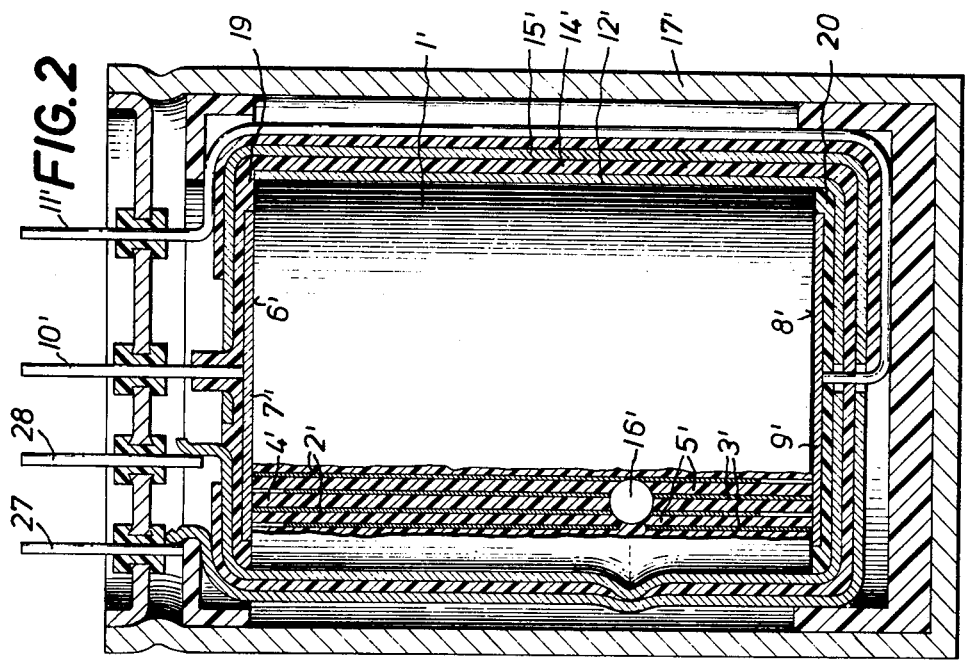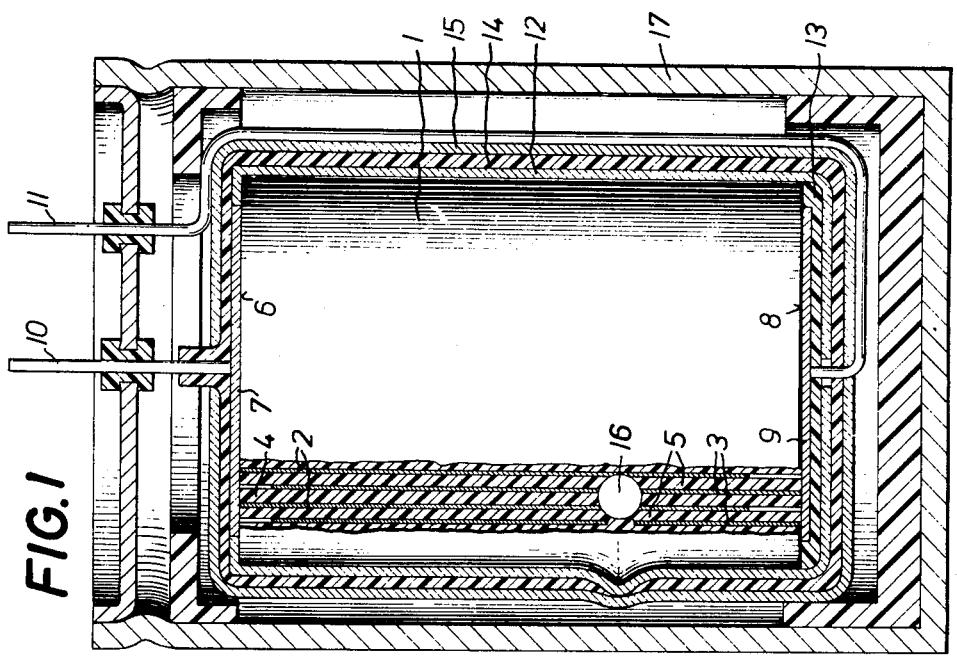

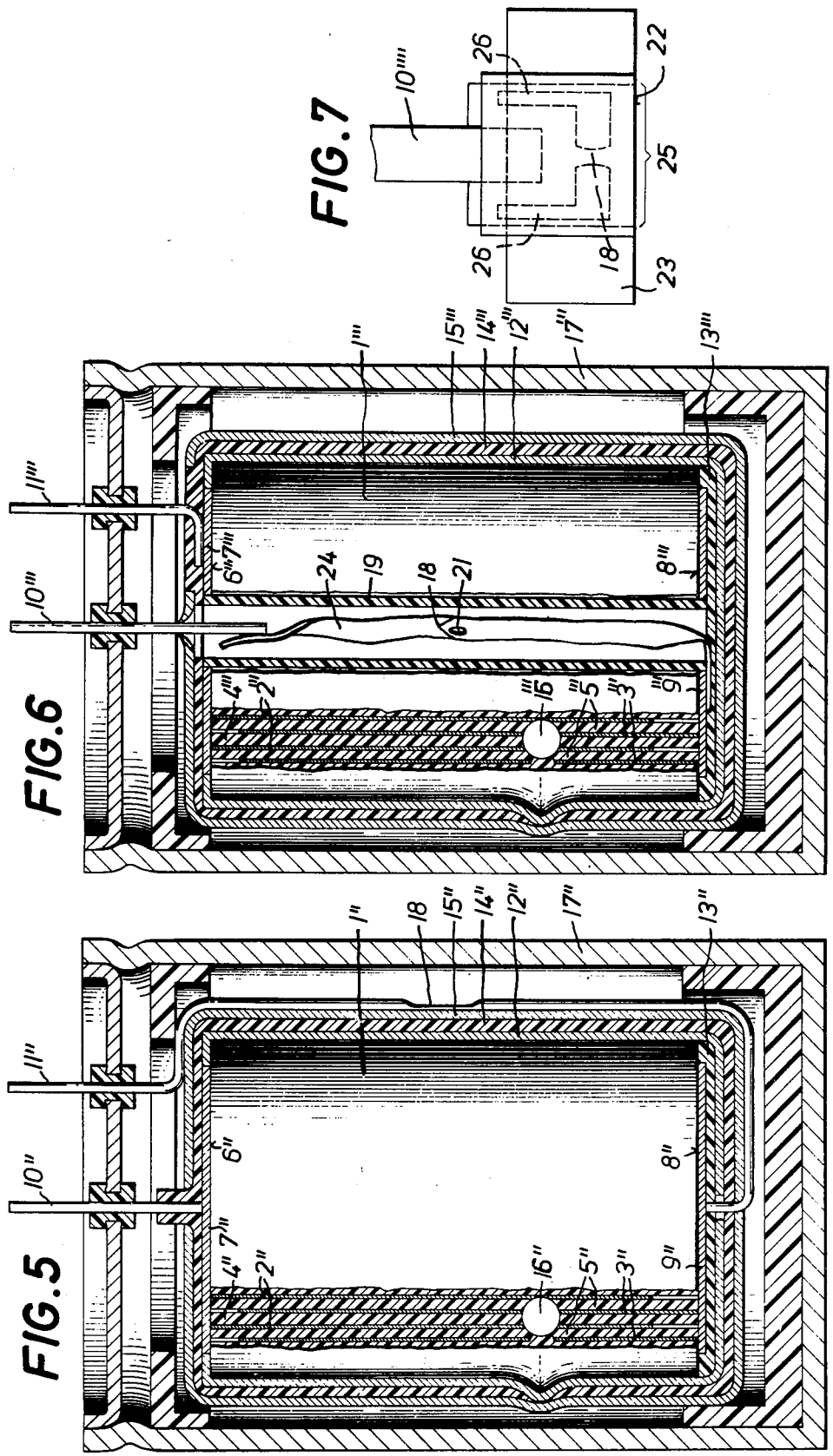

ELECTRICAL CAPACITOR WITH A FUSE

FIELD AND BACKGROUND OF THE INVENTION

This invention relates in general to electrical capacitors and, in particular, to a new and useful electrical capacitor comprising metal coatings deposited on a support, particularly, thin coatings, capable of being burnt out by heat, and a dielectric and/or additional dielectric which is plastically deformable or fuses under the heat produced at the occurrence of breakdowns between the coatings.

DESCRIPTION OF THE PRIOR ART

In capacitors which are built up, for example, of metallized polypropylene foils, upon the occurrence of the self-healing effect known from exhaustive tests with MP capacitors, it has been found that such heat is produced that the polypropylene melts and carbonizes at the same time and, due to the pressure produced thereby, leaks out at the surface of the capacitor roll as a fused mass in the form of larger or smaller drops.

Thus, in the manufacture of power capacitors, some of the products are affected by imperfections which only produce their effect later, perhaps after longer service, and lead to failures. In order to particularly avoid the consequences which may result in operation from a destroyed capacitor, capacitors have been provided with safety elements which prevent the capacitor housing from bursting.

In the known capacitors having thin metal coatings, and which are capable of being healed, the additional current following the burning-out of an unsound spot is too small to make a safety fuse which will respond. However, in capacitors containing impregnating agents, gases are developed in an amount such that the housing would burst. This gas pressure is utilized, for example, in accordance with German Pat. No. 1,289,584, to expand the housing and thereby rupture a notched safety wire, for example.

Therefore, capacitors containing little or no impregnating agents and in which only little gas is given off by the dielectric upon a failure of the mentioned kind, cannot have the desired effect on a safety fuse nor on an element responsive to gas pressure. According to operating regulations, however, power capacitors must be provided with a safety element which, upon a failure, separates the capacitor from the power supply system, or the capacitors must be designed in a manner such that in case of a failure, they actuate the fuse which is required in the circuit.

SUMMARY OF THE INVENTION

The present invention is directed to a capacitor designed in such a manner that, upon a failure in the capacitor, the capacitor is securely disconnected from the power supply.

To this end, in accordance with the invention, the capacitor body is surrounded at least along its circumferential surface (lateral superficies) in consecutive order, by a first metal layer, an insulating layer which fuses or is at least plastically deformable under excess temperature, and a second metal layer; and each of the metal layers is connected, in an electrically conductive manner, to a respective one of the capacitor coatings or armatures. Thus, upon the occurrence of a larger burnt-out spot, a bulge forms on the surface of the capacitor body, i.e., due to the excess temperature, the insulating layer at this location is displaced, so that the two metal layers come into contact and cause a short circuit which actuates a safety element in the circuit of the capacitor.

The invention is further directed to a design in which, due to the response of the associated safety element, an electrical or electronic device associated with the inventive capacitor, for example, a fluorescent lamp or a DC motor with an auxiliary or starting winding, can be securely separated from the power supply system.

This latter problem is solved, in accordance with the invention, by providing that the capacitor body is surrounded, at least along its circumferential surface, in consecutive order, by a first metal layer, an insulating layer which fuses or, is at lest plastically deformable under excess temperature, and a second metal layer, and that at least one of the metal layers is connected to a terminal lead to the outside. The two terminal leads of the metal layers of the inventive capacitor may be connected to the operating voltage of the device, so that, for example, at the occurrence of a failure in the capacitor, particularly of a larger burnout, a bulge forms on the surface of the capacitor body, the insulating layer in the zone of this bulge is displaced due to the excess temperature produced, and the two metal layers contact each other and cause a short-circuit which actuates a safety element provided in the circuit.

Another object of the invention is to provide a capacitor having an internal safety fuse. For this purpose, the capacitor body is surrounded, at least along its circumferential surface, in consecutive order, by a first metal layer, an insulating layer which fuses or is at least plastically deformable under excess temperature, and a second metal layer, and each of the metal layers is connected, in an electrically conductive manner, to a respective one of the capacitor armatures, and an internal fuse is provided in the capacitor. Due to this provision, at the occurrence of a larger burnout, a bulge is formed on the surface of the capacitor body and, due to the excess temperature, the insulating layer is displaced in this zone, so that the two metal layers contact each other and cause a short-circuit to actuate the internal fuse.

Accordingly, an object of the invention is to provide a capacitor which includes a capacitor body having an enveloping portion at least on the sides thereof, including two conductive metal layers separated by an insulation material which will defuse or deform to an extent to cause the metal layers to make electrical contact and wherein the metal layers are connected so as to actuate a fuse or other device for disconnecting the capacitor.

Another object of the invention is to provide a capacitor which comprises a coil cylindrical body having alternate metal and insulation layers, with a contact plate at one end connecting one of the alternate sets of metal layers and a contact plate at the opposite end connecting the other alternate metal layers and including at least one actuation layer made up of two metal layers arranged around the periphery of the body spaced apart by an insulation material which will defuse or deform to permit contact of the metal layers and actuation of a fuse circuit upon the occurrence of a temperature over a predetermined amount within the capacitor body.

A further object of the invention is to provide an electrical capacitor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the Drawings:

FIG. 1 is a transverse sectional view of a capacitor constructed in accordance with the invention;

FIG. 2 is a view similar to FIG. 1 of another embodiment of capacitor;

FIG. 3 is a circuit diagram of a capacitor constructed in accordance with the embodiment of FIG. 2 and connected to a single-phase DC motor;

FIG. 4 is a circuit diagram of a capacitor constructed in accordance with the embodiment of FIG. 2 and connected to a fluorescent lamp; and FIGS. 5, 6 and 7 are views, similar to FIG. 1, of different embodiments of the invention.

DESCRIPTION OF THE PREFERRED EMBODIMENTS

Referring to the drawings in particular, the invention embodied therein, comprises in FIG. 1, a capacitor body 1, for example, a capacitor roll, having armatures or metal coatings 2 and 3 made of healable thin metal layers deposited, for example, by evaporation on dielectric supports 4 and 5, respectively. Supports 4 and 5 are made of a material which is plastically deformable or fuses at excess temperatures, particularly, of polypropylene. Supports 4 or 5 may be metallized on one or both sides and the arrangement may be such that the support occupies a field-free space while an additional dielectric foil, made of a material having the same or similar thermal properties as the supports 4 and 5 is wound in as the dielectrically effective foil. In addition, the capacitor body 1 may be impregnated with an insulating compound. The invention is, however, to be applied preferably to non-impregnated capacitor bodies, where the advantages of the inventive design become particularly conspicuous.

Metal coatings or metal conductive layers 2 are connected to each other by a contact layer 7 on their upper front side 6, which, for example, is sprayed thereon, and metal coatings or metal conductive layers 3 are similarly connected to each other by a contact layer 9 on their lower front side 8. A respective terminal lead 10 and 11 is connected to each of contact layers 7 and 9.

Capacitor body 1 is surrounded, at least along its circumferential surface, with roll-type bodies, along its lateral superficies, by a first metal actuation or safety layer 12 which is electrically conductively connected, for example, to contact layer 7, and electrically insulated, by a non-conducting layer 13, from both contact layer 9 and terminal lead 11. Layer 13 may comprise a foil, an insulating disc-shaped plate, or a material applied in liquid or pasty state and may, for example, be capable of setting.

An insulating layer 14 completely covering layer 12 is provided on top of first metal actuation layer 12, the layer 14 being made of a material which fuses or is plastically deformable at excess temperatures, for example, if polypropylene is used, at temperatures in excess of 160° C. In particular, this layer 14 is made of polypropylene or of an insulating material applicable in liquid state, for example, a wax or wax modified with a plastic. The layer may be put in place as a foil, for example, wound on or shrink-fitted, or applied in a dipping, spraying, or brushing operation.

Layer 14 advantageously embraces a portion of terminal lead 10, particularly if the entire surface of capacitor body 1 is provided with the inventive metal layers and with the insulating layer 14 enclosed therebetween.

In accordance with the invention, insulating layer 14 is surrounded by a second metal actuation layer or safety layer 15 which is electrically insulated from terminal lead 10 and contact lever 7 and is electrically conductively connected to terminal lead 11.

Metal layers 12 and/or 15 advantageously comprise a metal foil, particularly an aluminum foil, the thickness of which is at least 4 to 6 microns. At the front sides, disc-shaped foils are advantageously provided which have a rim with projecting fringes which are bent up or down in order to be overlapped by the lateral enveloping foil.

The spacing of metal layers 12 and 15 from each other or the thickness of insulating layer 14 is dimensioned so as to prevent any glow phenomena during operation of the capacitor, in cases where cavities would have been accidentally left between the layers.

In the example shown, it is assumed that at the location designated 16, a fault current is produced, resulting in an excess temperature, by which supports 4 and 5 are fused and carbonized. In this process, a small gas amount develops which produces a very high pressure. This results in a bulging of the surface of capacitor body 1 in this area. Inter alia, the high temperature and pressure cause fused support material to leak out of capacitor body 1. Insulating layer 14 is thereby also melted, so that metal layers 12 and 15 contact each other and cause a short-circuit to which, in turn, an excess-current cut-out, series-connected in the main circuit is responsive. In addition, the inventive metal layers 12 and 15 act as a capacitor.

In this way, a rapid disconnection of a defective capacitor is obtained and a bursting of capacitor housing 17 is securely prevented. Housing 17 may be made of metal or plastic. Instead of providing a housing, however, the capacitor body 1, manufactured in accordance with the invention, may finally be enclosed in an envelope of plastic, for example, by casting or injection-molding. For this purpose, epoxy resins are suitable, for example. FIG. 2 shows a capacitor, the internal structure of which corresponds, in principle, to that of FIG. 1.

Referring to FIG. 2, in accordance with the invention, a capacitor body 1' is surrounded, at least along its circumferential surface, thus, with roll-type bodies, along its lateral superficies, by a first metal layer 12' which is electrically conductively connected to a terminal lead 28 and electrically insulated, by a non-conducting layer 19, from contact layers 7' and 9' and terminal leads 10' and 11'. Layer 19 may comprise a foil, an insulating disc-shaped plate, or a material applied in liquid or pasty state and which is capable of setting.

An insulating layer 14', completely covering layer 12, is provided on top of first metal layer 12', with the layer 14' being made of a material which fuses or is plastically deformable at excess temperatures, for example, if polypropylene is used, at temperatures in excess of 160° C. In particular, this layer 14' is made of polypropylene or of an insulating material applicable in a liquid state, such as, a wax or a wax modified with plastic. The layer may be put in place as a foil, for example, it may be wound on or shrink-fitted, or applied in a dipping, spraying or brushing operation. Insulating layer 14' may be applied along with non-conducting layer 19 which may be made of the same material as the insulating layer 14'.

Layer 14' advantageously embraces a portion of terminal lead 10', particularly, if the entire surface of capacitor body 1' is provided with the inventive metal layers and with the insulating layer 14' enclosed therebetween.

In accordance with the invention, insulating layer 14' is surrounded by a second metal layer 15' which is electrically insulated from terminal leads 10' and 11' and from contact layers 7' and 9', and electrically conductively connected to a terminal lead 27.

The spacing of metal layers 12' and 15' from each other or the thickness of insulating layer 14' is dimensioned so as to prevent any glow phenomena during operation of the capacitor in cases where cavities would accidentally be left between the layers.

In the example shown, it is assumed that at the location designated 16', a fault current is produced resulting in an excess temperature by which supports 4' and 5' are fused and perhaps carbonized. In this process, a small amount of gas develops which, however, produces a very high pressure. This results in a bulging of the surface of capacitor body 1' in this area. Inter alia, the high temperature and pressure cause fused support material to leak out of capacitor body 1'. Insulating layer 14' is thereby also melted, so that metal layers 12' and 15' contact each other and cause a short circuit to which, in turn, an excess current cutout, series-connected in the main circuit, is responsive. The inventive metal layers 12' and 15' act as a capacitor, which may be utilized for measuring and/or controlling purposes.

With the invention, a rapid disconnection of a defective capacitor is obtained and bursting of the capacitor housing 17' is securely prevented. Housing 17' may be made of metal or plastic. Instead of providing a housing, however, the capacitor body 1' of FIG. 2, manufactured in accordance with the invention, may finally be enclosed in an envelope of plastic, for example, by casting or injection-molding. For this purpose, epoxy resins are suitable, for example.

A capacitor in accordance with the invention may advantageously be used as a motor capacitor. In such a case, the capacitor is connected in series with the auxiliary or starting winding of the field, and the metal layers 12' and 15' effective as a fuse protection are connected directly to the operating voltage protected by an excess-current cutout (FIG. 3).

Another possibility of application to fluorescent lamps is shown in FIG. 4. Here, the capacitor is connected in parallel to the lamp and in series to the ballast, and metal layers 12' and 15' are directly connected to the operating voltage. One of the metal layers 12' and 15' may also be connected to one of the capacitor armatures, without unfavorably affecting the function and advantages of the inventive device. This may also reduce the manufacturing costs of the capacitor. In some instances, however, a separate connection to the outside of both metal layers 12' and 15' is more advisable since they may then be connected, for example, for control purposes, to a particular voltage or a controlled systems.

FIG. 5 shows a capacitor body 1", for example, a capacitor roll, having its metal coatings 2" and 3" made of healable thin metal layers deposited, for example, by evaporation on a dielectric support 4" or 5". Supports 4" and 5" are made of a material which is plastically deformable or which fuses at excess temperatures, particularly of polypropylene. The support may be metallized on one or both sides and the arrangement may be such that the support occupies a field-free space while an additional dielectric foil, made of a material having the same or similar thermal properties as the supports, is wound in as the dielectrically effective foil. In addition, capacitor body 1" may be impregnated with an insulating compound. However, the invention is preferably for application to non-impregnated capacitor bodies where the advantages of the inventive design become particularly conspicuous.

On their upper front side 6", metal coatings 2" are connected to each other by a contact layer 7" which, for example, is sprayed thereon, and metal coatings 3" are similarly connected to each other, by a contact layer 9", on their lower front side 8". A terminal lead 10", 11" is connected to each of contact layers 7" and 9", respectively.

Capacitor body 1" is surrounded, at least along its circumferential surface, with roll-type bodies, along its lateral superficies, by a first metal layer 12" which is electrically conductively connected, for example, to contact layer 7" and is electrically insulated, by a non-conducting layer 13", from both contact layer 9" and terminal lead 11". Layer 13" may comprise a foil, an insulating disc-shaped plate, or a material applied in liquid or pasty state and, for example, capable of setting.

An insulating layer 14" completely covering layer 12" is provided on top of first metal layer 12", which is made of a material which fuses or is plastically deformable at excess temperatures, for example, if polypropylene is used, at temperatures in excess of 160° C. In particular, this layer is made of polypropylene or of an insulating material applicable in liquid state, for example, a wax or wax modified with plastic. The layer may be put in place as a foil, for example, wound on or shrink-fitted, or applied in a dipping, spraying or brushing operation. Layer 14" embraces a portion of terminal lead 10", particularly if the entire surface of capacitor body 1" is provided with the inventive metal layers and with the insulating layer 14" enclosed therebetween.

In accordance with the invention, insulating layer 14" is surrounded by a second metal layer 15" which is electrically insulated from terminal lead 10" and contact layer 7" and is electrically conductively connected to terminal lead 11".

Metal layers 12" and/or 15" advantageously comprise a metal foil, particularly an aluminum foil, the thickness of which is at least 4 to 6 microns. Disc-shaped foils are advantageously provided at the front sides, and include a rim with projecting fringes which are bent down to be overlapped by the lateral enveloping foil. The spacing of metal layers 12" and 15" from each other or the thickness of insulating layer 14" is dimensioned so as to prevent any glow phenomena during operation of the capacitor, in cases where cavities would have been accidentally left between the layers. Further, in the embodiment of FIG. 5, a portion with a reduced cross-sectional area 18 is provided at a location along the length of terminal lead 11", which portion acts as a fuse at the occurrence of overcurrent.

In the example shown, it is assumed that at the location designated 16", a fault current is produced resulting in an excess temperature by which supports 4" and 5"

are fused and carbonized. In this process, a small amount of gas develops which produces a very high pressure. This results in a bulging of the surface of capacitor body 1" in this area. Inter alia, the high temperature and pressure cause fused support material to leak out of capacitor body 1". Insulating layer 14" is thereby also melted, so that metal layers 12" and 15" contact each other and cause a short circuit to which, in turn, the excess current protection designed, for example, as a portion with reduced cross-section in terminal lead 11", is responsive. In addition, the inventive metal layers 12" and 15" act as a capacitor.

In this way, a rapid disconnection of a defective capacitor is obtained and a bursting of capacitor housing 17" is securely prevented. Housing 17' may be made of metal or plastic. Instead of providing a housing, however, the capacitor body 1" manufactured in accordance with the invention may finally be enclosed in an envelope of plastic, for example, by casting or injection-molding. For this purpose, epoxy resins are suitable, for example.

In accordance with another advantageous embodiment of the invention, the internal safety fuse, according to FIG. 6, may comprise either a terminal lead 10''' extending through the hub 19 of a capacitor 1''' and having a portion with a reduced cross-section, or a fuse wire extending in the hub between terminal lead 10''' and contact layer 9''', or a fuse strip 24 having a portion with a reduced cross-section formed by a hole 21. Terminal lead 10''' and fuse wire or strip 20 are preferably welded to each other.

Further, in accordance with FIG. 7, in cases where at least one of the capacitor armatures is not contacted by a frontal contact layer, but by a contact strip 23 of a suitable metal foil or metallized insulant foil supported on the structure, the internal fuse may comprise an insertion fuse 22 which is provided with a terminal lead 10'''' or 11'''' and in which the contact strip 23 is insulated along a portion 25 and has, in this portion 25, a reduced cross-section 18 effective as a fuse and formed, for example, by bays and/or holes 26 punched in contact strip 23. The capacitor armatures are advantageously made of aluminum and contact strip 23 of an aluminum, copper or tin foil.

While specific embodiments of the invention have been shown and described in detail to illustrate the application of the principles of the invention, it will be understood that the invention may be embodied otherwise without departing from such principles.

What is claimed is: on

1. An electrical capacitor, comprising a capacitor body having at least one first dielectric support, a first conductive metal layer on said first dielectric support, a second dielectric support overlying said first metal layer, a second metal layer on said second dielectric support, a first end contact layer electrically connecting said first conductive metal layers adjacent one end of said body, a second metal contact layer electrically connecting said second conductive metal layers adjacent the opposite end of said body, said body having a surrounding dielectric layer and being surrounded at least on its side periphery in consecutive order by a first metal actuation layer, a dielectric layer which is deformable under excess temperature, and a second metal actuation layer, said dielectric layer which is deformable permitting contact of said first and second metal actuation layers whenever a temperature in said capacitor body exceeds a predetermined amount, and means connected to said first and second metal actuation layers for responding to the contact between said layers to protect said capacitor body.

2. An electrical capacitor, according to claim 1, wherein said means connected to said first and second actuation layers comprises respective first and second conductive layers.

3. An electrical capacitor, according to claim 1, wherein said means connected to said first and second actuation layers comprises an internal safety fuse.

4. An electrical capacitor, according to claim 1, including a terminal lead connected to each of said first and second contact layers, said means connected to said first and second metal actuation layers comprising respective first and second terminals.

5. An electrical capacitor, according to claim 1, wherein said capacitor body comprises a wound body having a central hub portion, a terminal extending through said hub portion in the exterior of said capacitor and being connected to said second contact layer and a second terminal connected to said first contact layer and extending out of said capacitor body.

6. An electrical capacitor, according to claim 1, wherein said first and second dielectric supports comprise a dielectric of polypropylene.

7. An electrical capacitor, according to claim 1, wherein at least one of said first and second dielectric layers comprises a polypropylene.

8. An electrical capacitor, according to claim 1, wherein said one of said first and second dielectric layers comprises wax.

9. An electrical capacitor, according to claim 1, wherein one of said insulation layers comprises a wax modified with plastic.

10. An electrical capacitor, according to claim 1, wherein said first conductive metal layer comprises a metal foil.

11. An electrical capacitor, according to claim 1, wherein said second conductive layer comprises a metal foil.

12. An electrical capacitor, according to claim 1, wherein said first and second conductive metal layers comprise a metal foil of at least 4 microns.

13. An electrical capacitor, according to claim 12, wherein said metal foil comprises aluminum.

14. An electrical capacitor, according to claim 1, wherein said capacitor body comprises a wound body of said first and second dielectric supports with said first and second conductive metal layers, said first and second contact layers comprising an end plate at each end of said coil, a non-conductive layer overlying each of said first and second contact plates, a contact lead extending through the insulation overlying each of said plates and to the exterior of said capacitor body, said dielectric layer which is deformable surrounding said capacitor body completely, said second metal actuating layer surrounding the exterior of said insulation except for an area around said terminal, said means connected to said first and second actuating layers including said second terminal being connected to the second metal layer and said first terminal being connected to said first contact layer.

15. An electrical capacitor, comprising a housing, a capacitor in said housing made up of first and second alternate dielectric layers and first and second conductive metal layers, the upper ends of said first metal conductive layers terminating in a contact plane, the lower ends of the second conductive metal layers terminating in a lower contact plane, respective upper and lower contact plates overlying and connected to the respective first and second metal conductive layers, a first metal actuating layer extending around the sides of said capacitor body and around one end in contact with each respective end of said contact layer being insulated from said second contact layer at the opposite end, a deformable or defusable layer of insulating material over said first actuating layer and said first and second contact plates, the second metal actuating layer overlying said deformable insulation material, a first terminal extending through said second actuating metal layer and being insulated therefrom by said deformable insulation material, a second terminal connected into said housing extending through said first and second actuatable metal layers but being insulated therefrom and connected to said second contact.

16. An electrical capacitor, according to claim 15, wherein the spacing between said actuating metal layers and the thickness of said deformable insulation material layer is chosen in accordance with the maximum admissible field intensity with air considered as the dielectric.

17. An electrical capacitor, according to claim 15, wherein said housing comprises a plastic envelope surrounding said capacitor body.

18. An electrical capacitor, comprising a capacitor body having at least one first dielectric support, a first conductive metal layer on said first dielectric support, a second dielectric support overlying said first metal layer, a second metal layer on said second dielectric support, a first end contact layer electrically connecting said first conductive metal layers adjacent one end of said body, a second metal contact layer electrically connecting said second conductive metal layers adjacent the opposite end of said body, said body having a surrounding dielectric layer and being surrounded at least on its side periphery in consecutive order by a first metal actuation layer, a dielectric layer which is deformable under excess temperature, and a second metal actuation layer, said dielectric layer which is deformable permitting contact of said first and second metal actuation layers whenever a temperature in said capacitor body exceeds a predetermined amount, and means connected to said first and second metal actuation layers for responding to the contact between said layers to protect said capacitor body, said means connected to said first and second actuating layers comprising a safety fuse, including a terminal connected to each of said contact layers, one of said terminals having a reduced cross-section comprising said fuse.

19. An electrical capacitor, comprising a capacitor body having at least one first dielectric support, a first conductive metal layer on said first dielectric support, a second dielectric support overlying said first metal layer, a second metal layer on said second dielectric support, a first end contact layer electrically connecting said first conductive metal layers adjacent one end of said body, a second metal contact layer electrically connecting said second conductive metal layers adjacent the opposite end of said body, said body having a surrounding dielectric layer and being surrounded at least on its side periphery in consecutive order by a first metal actuation layer, a dielectric layer which is deformable under excess temperature, and a second metal actuation layer, said dielectic layer which is deformable permitting contact of said first and second metal actuation layers whenever a temperature in said capacitor body exceeds a predetermined amount, and means connected to said first and second metal actuation layers for responding to the contact between said layers to protect said capacitor body, a contact terminal lead extending through the center of said body and connected to said second contact layer to the exterior of said capacitor body, said contact terminal comprising a safety fuse, said means connected to said first and second metal actuation layers comprising said safety fuse.

20. An electrical capacitor, comprising a capacitor body having at least one first dielectric support, a first conductive metal layer on said first dielectric support, a second dielectric support overlying said first metal layer, a second metal layer on said second dielectric support, a first end contact layer electrically connecting said first conductive metal layers adjacent one end of said body, a second metal contact layer electrically connecting said second conductive metal layers adjacent the opposite end of said body, said body having a surrounding dielectric layer and being surrounded at least on its side periphery in consecutive order by a first metal actuation layer, a dielectric layer which is deformable under excess temperature, and a second metal actuation layer, said dielectric layer which is deformable permitting contact of said first and second metal actuation layers whenever a temperature in said capacitor body exceeds a predetermined amount, and means connected to said first and second metal actuation layers for responding to the contact between said layers to protect said capacitor body, a terminal lead connected to each of said contact layers, a fuse wire extending between one of said contact terminal layers and one of said first and second metal conductive layers and comprising said means connected to said first and second metal actuation layers.

21. An electrical capacitor, according to claim 20, wherein said fuse wire comprises a portion with a reduced cross-section.

22. An electrical capacitor, comprising a capacitor body having at least one first dielectric support, a first conductive metal layer on said first dielectric support, a second dielectric support overlying said first metal layer, a second metal layer on said second dielectric support, a first end contact layer electrically connecting said first conductive metal layers adjacent one end of said body, a second metal contact layer electrically connecting said second conductive metal layers adjacent the opposite end of said body, said body having a surrounding dielectric layer and being surrounded at least on its side periphery in consecutive order by a first metal actuation layer, a dielectric layer which is deformable under excess temperature, and a second metal actuation layer, said dielectric layer which is deformable permitting contact of said first and second metal actuation layers whenever a temperature in said capacitor body exceeds a predetermined amount, and means connected to said first and second metal actuation layers for responding to the contact between said layers to protect said capacitor body, means connected to said first and second metal actuation layers comprising a safety fuse including a contact strip connected to one of said contact plates and supported on one of said first and second conductive metal layers and held in contact with this layer by pressure, one portion of said strip being insulated against said associated conductive metal coating and having a reduced cross-sectional area effective as a safety fuse provided in this portion.

* * * * *